United States Patent Office 3,325,572
Patented June 13, 1967

3,325,572
PROCESS FOR PREPARING SMALL, DENSIFIED NITROCELLULOSE PARTICLES
John J. Sapiego, New Brunswick, N.J., assignor to Hercules Incorporated, Wilmington, Del., a corporation of Delaware
No Drawing. Filed May 24, 1966, Ser. No. 552,411
4 Claims. (Cl. 264—3)

This invention relates to the manufacture of smokeless powder granules and more particularly to an improved process for the manufacture of small, densified particles of nitrocellulose suitable for use in smokeless powder and other nitrocellulose applications.

The time-honored conventional process for preparing smokeless powder granules has consistently over the years been a reliable process for producing a product of uniform physical properties and ballistic performance. However, the process is tedious and lengthy and requires considerable massive and expensive equipment. More specifically, the process involves dehydrating water-wet nitrocellulose with denatured alcohol in a conventional blocking press, and the blocks of dehydrated nitrocellulose are then broken up in a block breaker. The resulting dehydrated nitrocellulose is then masticated in large Baker-Perkin dough mixers with nitroglycerin, denatured ethyl alcohol and acetone to form a homogeneous stiff dough which is then blocked into cylinders in large hydraulic presses, which blocked cylinders are then extruded through dies into strands in hydraulic presses at high pressures, and the strands are cut into the desired particle or grain size in cutters. The resulting powder grains must then be dried for several days in warm, dry houses, after which the dried grains are coated and glazed in Sweetie barrels, screened and blended.

Smokeless powder granules have also been prepared by a procedure known in the art as the "Ball Powder" process. Very briefly, this process involves dispersing a solution of nitrocellulose in a substantially water-immiscible volatile nitrocellulose solvent in water in the presence of a water-soluble protective colloid such as starch or gum arabic with agitation to form an emulsion or suspension of lacquer globules in water, and the solvent is then stripped from the lacquer globules by distillation under controlled distillation conditions, and usually in the presence of an electrolyte such as sodium sulfate dissolved in the water phase of the emulsion or suspension. In this process the protective colloid coats each lacquer globule to prevent the globules from coalescing into large globules, and the solvent must be gradually removed at a carefully controlled rate to promote the formation of dense spherical and spheroidal particles of nitrocellulose. The electrolyte in the water phase of the emulsion also promotes improved densification of the particles as the solvent is removed.

An object of this invention, therefore, is to provide a simplified and improved process for manufacture of smokeless powder granules, which has procedural and economic advantages over prior art processes.

Another object of this invention is to provide an improved process for manufacture of relatively small ellipsoidal and spheroidal particles of densified nitrocellulose suitable for use as smokeless powder granules and in other applications where relatively small particles of densified nitrocellulose are necessary or desirable.

It is a further object of this invention to provide an improved process for manufacture of small ellipsoidal and spheroidal particles of densified nitrocellulose substantially within a size range from about 150 to about 600 microns.

Another object of this invention is to provide an improved process for manufacture of small ellipsoidal and spheroidal particles of densified nitrocellulose directly from dry fibrous nitrocellulose and wetted with hydrocarbon diluent.

In my copending U.S. application Ser. No. 522,824 filed Jan. 25, 1966, there is disclosed a technique for preparing nitrocellulose particles within the size range of about 100 to 500 microns. This process comprises dispersing water wet fibrous nitrocellulose in a volatile mixture of a nitrocellulose solvent and a hydrocarbon diluent which softens and swells, but does not dissolve the nitrocellulose, subjecting the dispersion to mild shearing agitation until all of the fibers are softened, swollen and comminuted into the desired size fragments, adding a nonsolvent liquid to the slurry to solidify the softened surfaces of the nitrocellulose and inhibit agglomeration thereof and continuing agitation until the fiber fragments have substantially all become shaped into smooth surfaces, rounded particles of substantially ellipsoidal and spheroidal shapes. The nitrocellulose particles thus produced are practically all within the size range of 100 to 500 microns with the substantial majority being with the range 100 to 300 microns, and exhibits fairly high surface porosity. This combination of size and porosity results in the particles exhibiting a relatively high burning rate.

In accordance with this invention a process has been found whereby smooth, densified nitrocellulose particles having a larger particle size and less surface porosity, with resultant lower burning rate, can be produced. The procedure according to the instant invention comprises slurrying anhydrous fibrous nitrocellulose in a mixture of an active nitrocellulose solvent and a hydrocarbon diluent and subjecting the slurry to mild shearing agitation until the fibrous nitrocellulose is substantially free of nitrocellulose fiber aggregates and all of the nitrocellulose fibers have been softened and swollen, then adding a water solution of a nitrocellulose protective colloid, thereafter continuing agitation while slowly adding a nitrocellulose nonsolvent diluent to harden the surfaces of the unagglomerated fibers, continuing the agitation until the hardened fragments have substantially all been shaped into smooth surfaced, rounded particles of substantially ellipsoidal and spheroidal shapes, and heating the slurry to drive off the active nitrocellulose solvent, while adding sufficient hydrocarbon diluent to maintain the nitrocellulose granules wetted therewith.

The process produces a slurry of small, hard, rounded and smooth-surfaced particles of substantially ellipsoidal and spheroidal shapes which are recovered wetted with sorbed hydrocarbon. Recovery can be effected by any convenient means, such as by gravity drainage, centrifugation, suction filtration, or the like. These densified particles have a diversity of particle sizes substantially in the range from about 200 to about 400 microns, with an overall spread between about 150 to 600 microns, and with a substantial majority of the particles having sizes in the range from about 200 to about 350 microns. The absolute density of these particles is at least about 1.3 gms./cc., and normally is in the range from about 1.32 to about 1.38 gms./cc., the absolute density of completely densified nitrocellulose being approximately 1.65 gms./cc. The bulk density of these particles is at least about 45 lbs./cu. ft., and normally is in the range from about 50 to about 55 lbs./cu. ft. When magnified, these particles are seen to have smooth, dense, glazed surfaces, and are crystalline in appearance.

In practicing this invention, water or alcohol wet fibrous nitrocellulose, after conventional treatments for stabilization and viscosity adjustment, is dried to about 1% moisture content or less and is slurried in a mixture of an active nitrocellulose solvent and a liquid hydrocarbon diluent and subjected to mild shearing agitation to break up fiber aggregates and disperse the fibers in the solvent-diluent mixture.

Any volatile aliphatic hydrocarbon which is liquid at ordinary temperatures and atmospheric pressure may be employed for the purposes of this invention. Some typical hydrocarbons include by way of example, hexane, heptane, octane, isooctane, nonane, and the like, various proprietary petroleum distillate cuts such as textile spirits, mineral spirits, lactol spirits, VM&P naphtha, gasoline, kerosene, and the like. Aliphatic hydrocarbons and mixtures of the same which boil in the range of heptane or lactol spirits are preferred, and heptane is especially preferred.

Nitrocellulose solvents suitable for the purposes of this invention are the lower molecular weight ketones, esters, glycol ether-alcohols and glycol ether-esters which are soluble in hydrocarbon liquids to the extent of at least about 2.5% by weight. Some typical nitrocellulose solvents include, methyl formate, ethyl formate, methyl acetate, ethyl acetate, isopropyl acetate, methyl propionate, acetone, methyl ethyl ketone, diethyl ketone, ethylene glycol monomethyl ether, ethylene glycol monoethyl ether, methoxyethyl acetate, and the like. Preferably, the nitrocellulose solvent component of the organic liquid mixture of this invention should have a boiling point below the boiling point of the hydrocarbon diluent, or should form a minimum boiling azeotropic mixture therewith. Acetone is especially preferred.

The dispersion in the solvent-diluent mixture is effected at substantially room temperature with mild shearing agitation, such as is produced by a Cowles Dissolver (Morehouse-Cowles, Inc., 1150 San Fernando Road, Los Angeles, California), or the like, rotating at a rotational speed in the range from about 1,000 r.p.m. to about 4,000 r.p.m., in the volatile organic liquid mixture of hydrocarbon diluent and nitrocellulose solvent, which mixture is only a softening and swelling agent, incapable of dissolving, the nitrocellulose fibers, to form a stirrable slurry substantially free of fiber aggregates. The dry nitrocellulose fibers are introduced into the volatile organic liquid mixture as rapidly as the agitating device can disperse them, either in small increments or continuously, as desired. The time required to accomplish addition and dispersal of the fibers is usually quite short, amounting at most to only a few minutes.

When all of the fibrous nitrocellulose hase been thoroughly dispersed and softened by the action of the active nitrocellulose solvent, a water solution of a protective colloid is added to facilitate agglomeration of the softened fibers into granules and to bind the same more effectively together. The amount of the water-soluble protective colloid will usually be on the order of about 0.1 to 0.2%, based on the total weight of the slurry. At least two important beneficial results are derived from the use of the protective colloid solution. One such result is that the overall range of particle size is displaced to larger particles. That is to say, following a similar procedure without the use of the protective colloid the particle size range is from about 100 to 500 microns; with the protective colloid, this range is about 150 to 600 microns. Another equally important effect is a substantial increase in the bulk density of the particles. When the procedure is carried out without the protective colloid, the bulk density of the particles is so low as to be commercially unacceptable. Apparently due to the agglomerating effect of the protective colloid, the particles become bound more tightly, into denser granules, having significantly higher bulk density.

Substantially any water-soluble protective colloid can be employed in this invention. Some typically suitable water-soluble protective colloids include, by way of example, water-soluble, alkyl ethers of cellulose, hydroxyalkyl ethers of cellulose, mixed alkyl hydroxyalkyl ethers of cellulose, such as methyl cellulose, ethyl cellulose, hydroxyethyl cellulose, hydroxypropyl cellulose, methyl hydroxyethyl cellulose, methyl hydroxypropyl cellulose, ethyl hydroxyethyl cellulose, and the like; water-soluble alkyl ethers of starch, hydroxyalkyl ethers of starch, mixed alkyl hydroxyalkyl ethers of starch, such as methyl starch, ethyl starch, hydroxyethyl starch, hydroxypropyl starch, methyl hydroxyethyl starch, methyl hydroxypropyl starch, and the like; alkali metal and ammonium salts of alginic acid, such as sodium alginate, ammonium alginate, potassium alginate, and the like; alkali metal and ammonium salts of naphthalene sulfonic acid, and lignosulfonic acid; alkali metal and ammonium salts of glucuronic, galacturonic, manuronic, and related acid structures present in various vegetable mucilages, pectins and gums; polyoxyalkylene glycols, such as polyoxyethylene glycol, polyoxypropylene glycol, and the like; adducts of ethylene oxide and nonyl phenol, etc. Water-soluble methyl cellulose and gum arabic are preferred as the water-soluble protective colloid.

Mild shearing agitation is continued on the resulting slurry until substantially all of the nitrocellulose fibers have become uniformly softened and swollen and formed into fragments substantially within the size range from about 150 to about 600 microns. The progress of the softening, swelling, and forming action can readily be followed by observation of samples taken at intervals, aided by magnification. Softening and swelling of the fibers commences as soon as they have been introduced into the organic liquid mixture, and the particles become progressively more softened and swollen until an ultimate degree of softening and swelling, depending largely upon the proportions of nitrocellulose solvent and hydrocarbon diluent in the liquid mixture, is attained. The time required to reach this ultimate degree of softening and swelling may be anywhere from about 10 minutes to one-half hour or more.

The mild shearing agitation contemplated by this invention is provided by agitators which have rotating disc impellers having peripheral projecting and raised tooth-like vanes and which rotate at moderately high speeds, up to about 5,000 to 6,000 r.p.m. Such impellers impart moderately high velocity to the material in a zone of intense turbulence immediately surrounding the impeller. As the high velocity material is forced rapidly outward by centrifugal force, it impinges on the surrounding slower moving portions of the slurried material, thereby effecting attrition by a combination of violent impact and shearing of particle on particle. Recirculation of the slurried material back into the zone of intense turbulence is rapid. Conventional paddle or turbine agitators are incapable of providing the degree of shearing action which is important and necessary for the purposes of this invention. On the other hand, attrition mills, such as the Kady Dispersion Mill, which rotate at very high speeds in the range of 10,000 to 16,000 r.p.m. and which generate very high shearing action on the slurried fibers, produce particles, a substantial majority of which are smaller than the size range contemplated by this invention.

When observation indicates that a substantial equilibrium condition exists in the agitated slurry and that a substantial majority of the comminuted fragments are in the desired size range, the slurry is then diluted, while continuing the mild shearing agitation, with sufficient hydrocarbon diluent to form a case-hardened layer of tough, densified nitrocellulose substantially free of stickiness enveloping each softened and swollen nitrocellulose fiber fragment. The purpose of this dilution is to arrest and inhibit further agglomeration of the comminuted softened and swollen fragments. The nonsolvent selected for this purpose is a hydrocarbon which is preferably, but not necessarily, the same as the hydrocarbon component of the solvent-diluent mixture. The amount of hydrocarbon diluent to effect the desired case-hardening of the fiber fragments should be at least about 7% by weight, based on the combined weight of the nitrocellulose solvent and hydrocarbon diluent components of the solvent-diluent mixture, and can be added in a single portion or in several increments with an interval of mild shearing agitation between additions. The interior of the case-hardened fiber fragments after the addition of diluent is still soft and swollen, and the fiber fragments are quite susceptible to shaping into smooth-surfaced, rounded particles of substantially ellipsoidal and spheroidal shapes by continued mild shearing agitation. This is probably due to the fact that the case-hardened fragments with a soft and swollen interior structure are resilient and rubbery with surfaces substantially free of stickiness. Accordingly, mild shearing agitation is continued on the diluted slurry for a period of 20 to 30 minutes or more until observation indicates that substantially all of the fragments have become rounded and smoothed into substantially ellipsoidal and spheroidal shapes.

The diluted slurry is then subjected to distillation to remove the active solvent and to complete the hardening and densification of the particles, adding additional hydrocarbon liquid as needed to maintain the liquid level in the distillation vessel. The distillation is continued until substantially all nitrocellulose solvent and water remaining from the protective colloid addition are removed, leaving a slurry of hardened and densified nitrocellulose particles in hydrocarbon diluent. The slurry desirably should be agitated during the distillation step, and any conventional propeller, paddle, or turbine agitator will suffice, for the case-hardened particles have a negligible tendency to stick together. As noted hereinabove, the hardened and densified particles of nitrocellulose are readily recovered wetted with sorbed hydrocarbon diluent, at the termination of the distillation step, by draining off excess hydrocarbon by any convenient method, such as by gravity drainage, suction filtration, centrifugation, or the like.

It has been found that particle uniformity with respect to both size and spheroidal shape is improved by inserting flat plate-like baffles, one, two, or more, into the slurry above the rotating impeller at a downwardly sloping inclined angle during the case-hardening and shaping of the comminuted swollen and softened fiber fragments.

Various additives such as nitrocellulose stabilizers, carbon black, desensitizing plasticizers, and other desirable additives which are soluble or dispersible in the densifying medium of this invention can be introduced into the slurry at any convenient point in the process and become very uniformly distributed into the nitrocellulose product.

In addition to use in the manufacture of smokeless powder, the densified nitrocellulose particles of this invention can be used in any application where commercial nitrocellulose is now used, such as lacquers, plastics, paints, adhesives, coatings, inks, impregnations, and the like. The chemical characteristics of the product of this invention are substantially the same as commercial nitrocellulose, since no chemical action is involved in the process of producing this prdouct.

The general nature of the invention having been set forth, the following examples are presented as specific illustrations thereof. All parts and percentages are by weight unless otherwise stated.

*Example 1*

Water-wet, fibrous nitrocellulose [13.4% $N_2$ by weight, 17 seconds, 5/16 inch falling ball viscosity measured in accordance with Military Spec. JAN–N–244] after conventional treatments for stabilization and viscosity adjustment, was slurried with water to the consistency of a conventional pulping slurry and jordaned to break up fiber aggregates, shorten the fibers and produce a slurry of nitrocellulose fibers substantially free of fiber aggregates. This slurry was de-watered and dried by means of hot air at 65° C. to a total solids content of about 99%.

Three hundred and sixty-five (365) parts of this anhydrous nitrocellulose was charged to a Cowles dissolver fitted with two baffles and containing 1735 parts of a 50/50 mixture of acetone and n-heptane. The resultant slurry was agitated at about 3000 r.p.m. for about 5 minutes, at which time about 26 parts of a 16% solution of gum arabic in water was added. Agitation was continued at the same rate for about 15 minutes. Observation of a sample withdrawn from the slurry at this time showed substantially all of the fibers to be uniformly softened and swollen, and formed into fragments substantially within the size range of about 150 to 600 microns.

An additional 500 parts of heptane was added to the slurry at this point to case-harden the pellets and agitation was continued for about 100 minutes, during which the particles were shaped into smooth-surfaced irregularly shaped granules in the 150 to about 600 micron particle size range. The majority of the particles were in the range of about 200 to 350 microns. The absolute density of this product was 1.371 and the bulk density 52.9.

A similar test was conducted concurrently wherein no gum arabic was added to the slurry. The resultant particles were in the range of about 100 to 500 microns, with the substantial majority thereof being in the range of about 200 to 300 microns. The absolute density was 1.583 gms./cc. and the bulk density was 30 lbs./cu. ft.

*Example 2*

The procedure of Example 1 was substantially repeated except that the Cowles Dissolver contained no baffles and the agitation was continued for just one hour. Smooth-surfaced, very irregularly shaped particles, having absolute density of 1.321 and bulk density of 49.9 lbs./cu. ft. were produced. These particles had a size range of about 150 to 600 microns with the majority in the range of 250 to 400 microns.

When the time of agitation was extended to 115 minutes, the particles were found to be much more regularly shaped, with absolute density of 1.336 gms./cc. and a bulk density of 51.5 lb./cu. ft.

When the agitation was conducted for one hour at 5000 r.p.m., the same result—i.e., 1.336 gms./cc. absolute density and 51.5 lbs./cu ft bulk density—was achieved.

*Example 3*

Water-wet, fibrous nitrocellulose was treated and dried as described in Example 1, above.

About 366 parts of the dried nitrocellulose was charged to a Cowles Dissolver containing about 1735 parts of a 50/50 mixture of acetone and n-heptane. The resultant slurry was agitated at 3000 r.p.m. for about 5 minutes, when about 26 parts of a 16% solution of gum arabic in water was added. Agitation was continued at the same rate for another 15 minutes, during which time 500 ml. of n-heptane was added to harden the particles.

The charge was then transferred to a vessel containing a dual cone agitator and agitated at 2000 r.p.m. for about an hour. At the end of this period, acetone was removed by distillation over a period of about one-half hour. During this period n-heptane was added to replace the distilled acetone.

The nitrocellulose particles recovered from the procedure according to this example were quite regular in shape—i.e., ellipsoidal or spherical—and had absolute density of 1.347 and bulk density of 52 lbs./cu. ft.

The densified nitrocellulose particles of this invention can be produced from any fibrous nitrocellulose, obtained by nitrating natural or artificial cellulose fibers, such as cotton, purified cotton linters, purified wood pulp, regenerated cellulose fibers, and the like, in such forms as picked linters, shredded wood pulp, fluffed bulk linters, finely cut or ground fibers, fiber aggregate particles, and the like. However, it is important that the fibrous nitrocellulose be substantially free of fiber aggregates for use in this invention, for such aggregates interfere with proper comminution and lead to formation of undesirably large particles. Accordingly, it is both desirable and preferable to initially subject the fibrous nitrocellulose to a conventional jordaning, or similar fiber-beating treatment, to break up fiber aggregates and generally shorten the fibers prior to use in this invention. As pointed out above, this is accomplished by slurrying water-wet nitrocellulose fibers in water to the consistency of a conventional pulping slurry and beating in a jordan engine, or similar fiber-beating device.

Although smokeless-type nitrocellulose having a nitrogen content of about 13.4% or more by weight is the type of nitrocellulose customarily employed for the manufacture of smokeless powder, this invention is not limited to this type of nitrocellulose. On the contrary, substantially all commercial types and grades of fibrous nitrocellulose are suitable for the purposes of this invention, having nitrogen contents from about 10.9% to about 13.5% nitrogen by weight, and of any viscosity characteristic from the very low viscosity 10 centipoise type to exceedingly high viscosity types as exemplified by dynamite grade nitrocellulose.

The amount of nitrocellulose fibers which is employed in practicing this invention is governed by the ability to agitate the slurry effectively to form a uniformly smooth, readily stirrable slurry substantially free of fiber aggregates. Generally, slurries containing from about 11.9% to about 18.5% by weight of nitrocellulose, dry weight, have been employed, the optimum amount being around 17% by weight of nitrocellulose, dry weight. Slurries containing more than about 18.5% of nitrocellulose are usually of too high a consistency to be effectively agitated by the mild shearing agitation contemplated by this invention. Although slurries containing less than about 11.9% nitrocellulose can be employed, it is not considered economical to employ such slurries.

As noted above, the volatile organic liquid mixture which is employed as the medium for the comminution, shaping, and densification of the nitrocellulose is a mixture of hydrocarbon diluent and nitrocellulose solvent. It is important and necessary for the hydrocarbon diluent and nitrocellulose solvent to be proportioned in the mixture so that the mixture is only a swelling and softening agent for nitrocellulose, incapable of dissolving the fibers. It will be apparent, of course, that suitable proportions of hydrocarbon diluent and nitrocellulose solvent to accomplish this objective will vary depending principally on the particular hydrocarbon diluent and nitrocellulose solvent selected, and to a minor extent on the nitrogen content and viscosity characteristic of the nitrocellulose to be comminuted and densified. However, with any particular selection of hydrocarbon diluent and nitrocellulose solvent, it is a simple matter to carry out a preliminary trial by slurrying the nitrocellulose in the selected hydrocarbon diluent and then progressively adding the selected nitrocellulose solvent with agitation until the point is reached where the mixture begins to swell the fibers. It is then only necessary in practicing this invention to make minor increases or decreases in the ratio of nitrocellulose solvent to hydrocarbon diluent to obtain the desired shapes, density, bulk density, range of particle sizes, etc. When employing mixtures containing heptane and acetone as the medium for comminution, shaping, and densification of smokeless-type nitrocellulose of about 13.4% nitrogen, the ratio of acetone to heptane by weight can range from about 0.8 to about 1.4, and the ratio of acetone to nitrocellulose by weight can range from about 2 to about 3.5, optimum ratios being about one part acetone to one part heptane by weight and 2.4 parts acetone to one part nitrocellulose by weight.

What I claim and desire to protect by Letters Patent is:
1. A process for preparing small, densified nitrocellulose which comprises:
   (a) dispersing dry nitrocellulose fibers in a volatile organic liquid mixture capable of softening and swelling, but not dissolving the nitrocellulose, said mixture containing active nitrocellulose solvent and hydrocarbon diluent, with mild shearing agitation to form a slurry substantially free of nitrocellulose fiber aggregates;
   (b) adding to the said slurry 0.1 to 0.2% based upon the total weight of the slurry of a protective colloid to aid in agglomerating the swollen and softened nitrocellulose fibers, said protective colloid being added in the form of a water solution;
   (c) continuing the mild shearing agitation until substantially all of the nitrocellulose fibers are uniformly softened, swollen, and comminuted into fragments, substantially within the size range from about 150 to 600 microns;
   (d) diluting the slurry, while continuing the mild shearing agitation with sufficient hydrocarbon diluent to form a layer of tough, densified nitrocellulose substantially free of stickiness enveloping each softened and swollen nitrocellulose fiber fragment to inhibit further agglomeration of said fragments, and continuing said agitation until the fiber fragments have substantially all become formed into smooth-surfaced, particles of substantially ellipsoidal and spherical shape; and
   (e) thereafter, while continuing agitation, subjecting the diluted slurry to distillation to remove substantially all nitrocellulose solvent and to complete the hardening and densification of the particles.

2. A process in accordance with claim 1 in which the hydrocarbon component of said volatile organic liquid mixture is heptane and the nitrocellulose solvent is acetone.

3. A process according to claim 2 in which the protective colloid is gum arabic.

4. A process in accordance with claim 2 in which the nitrocellulose is a smokeless powder type, the initial ratio by weight of acetone to heptane in said volatile organic liquid mixture is between about 0.8 and about 1.4, by weight, and the ratio by weight of acetone to nitrocellulose is between about 1 and about 2.4.

References Cited

UNITED STATES PATENTS

| 2,715,574 | 8/1955 | Cox | 264—3 |
| 2,885,731 | 5/1959 | O'Neill | 264—3 |
| 2,946,673 | 8/1960 | Grassie | 264—3 |
| 2,948,601 | 8/1960 | Grassie | 264—3 |
| 3,236,702 | 2/1966 | Sapeigo | 264—3 |
| 3,284,253 | 11/1966 | Enders et al. | 264—3 |

L. DEWAYNE RUTLEDGE, *Primary Examiner.*